United States Patent
Chen et al.

(10) Patent No.: US 9,575,814 B2
(45) Date of Patent: Feb. 21, 2017

(54) IDENTIFYING HUNG CONDITION EXCEEDING PREDETERMINED FREQUENCY THRESHOLD AND MODIFYING HANGING ESCALATION TASKS TO AVOID HANG CONDITIONS

(71) Applicant: International Business Machines Corporation, Armonk, NY (US)

(72) Inventors: Danny Y. Chen, Austin, TX (US); Fabian F. Morgan, Austin, TX (US); Siddhartha Upadhyaya, Kolkata (IN); Sarah V. White Eagle, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/689,737

(22) Filed: Apr. 17, 2015

(65) Prior Publication Data

US 2015/0220373 A1    Aug. 6, 2015

Related U.S. Application Data

(63) Continuation of application No. 13/285,780, filed on Oct. 31, 2011, now Pat. No. 9,047,396.

(51) Int. Cl.
*G06F 9/52* (2006.01)
*G06F 9/48* (2006.01)
(Continued)

(52) U.S. Cl.
CPC ............ *G06F 9/524* (2013.01); *G06F 9/4881* (2013.01); *G06F 11/0757* (2013.01); *G06F 11/3433* (2013.01); *G06F 2201/81* (2013.01)

(58) Field of Classification Search
None
See application file for complete search history.

(56) References Cited

U.S. PATENT DOCUMENTS 6,047,261 A    4/2000 Siefert
6,763,377 B1 *  7/2004 Belknap ............ H04L 29/06027
                                                                  709/223
(Continued)

FOREIGN PATENT DOCUMENTS

WO    WO 01/06352 A2    1/2001

OTHER PUBLICATIONS

U.S. Appl. No. 13/285,655, 2 pages.
(Continued)

*Primary Examiner* — Abu Ghaffari
(74) *Attorney, Agent, or Firm* — Stephen J. Walder, Jr.; Christopher K. McLane

(57) ABSTRACT

In a method for processing work items that have not been completed by a first escalation, a computer determines that the first escalation failed to complete execution, processed fewer work items than the first escalation is configured to process, or completed execution beyond an allotted processing time. The computer duplicates the first escalation to form a second escalation. In addition, the computer configures the second escalation to process the work items that have not been completed by the first escalation. Furthermore, the computer disables the first escalation and activates the second escalation to process the work items that have not been completed by the first escalation.

18 Claims, 7 Drawing Sheets

(51) Int. Cl.
  *G06F 11/07* (2006.01)
  *G06F 11/34* (2006.01)

(56) References Cited

U.S. PATENT DOCUMENTS

| | | | |
|---|---|---|---|
| 6,829,764 | B1 | 12/2004 | Cohen et al. |
| 6,938,240 | B2 | 8/2005 | Charisius et al. |
| 7,010,724 | B1* | 3/2006 | Hicok .................. G06F 11/076 714/39 |
| 7,444,635 | B2 | 10/2008 | Lehtinen |
| 7,565,652 | B2 | 7/2009 | Janssen et al. |
| 7,836,448 | B1 | 11/2010 | Farizon et al. |
| 8,087,021 | B1 | 12/2011 | Holdman et al. |
| 8,145,595 | B2 | 3/2012 | Kloppmann et al. |
| 8,219,997 | B2 | 7/2012 | Shimizu et al. |
| 8,387,054 | B1* | 2/2013 | Zeis .................. G06F 9/4881 709/226 |
| 8,495,651 | B2 | 7/2013 | Kanai et al. |
| 8,555,288 | B2 | 10/2013 | Brown et al. |
| 8,904,397 | B2 | 12/2014 | Chen et al. |
| 2002/0062367 | A1* | 5/2002 | Debber .................. G06F 9/50 709/224 |
| 2003/0126114 | A1 | 7/2003 | Tedesco |
| 2005/0240926 | A1 | 10/2005 | Liu |
| 2005/0289232 | A1 | 12/2005 | Ebert |
| 2006/0037025 | A1 | 2/2006 | Janssen et al. |
| 2006/0179296 | A1 | 8/2006 | Bartlett et al. |
| 2007/0067363 | A1* | 3/2007 | Cooper .................. G06Q 50/22 |
| 2007/0156273 | A1 | 7/2007 | von Helmolt et al. |
| 2008/0066072 | A1* | 3/2008 | Yurekli .................. G06Q 10/06 718/104 |
| 2008/0115143 | A1 | 5/2008 | Shimizu et al. |
| 2008/0148257 | A1 | 6/2008 | Ruml et al. |
| 2008/0281833 | A1* | 11/2008 | Cain .................. G06Q 10/06 |
| 2008/0288634 | A1 | 11/2008 | Onacko et al. |
| 2009/0052675 | A1 | 2/2009 | Levow et al. |
| 2009/0077016 | A1 | 3/2009 | Belknap et al. |
| 2011/0061051 | A1 | 3/2011 | Haber et al. |
| 2011/0137697 | A1 | 6/2011 | Yedatore et al. |
| 2011/0154360 | A1 | 6/2011 | Kikuchi et al. |
| 2011/0295643 | A1 | 12/2011 | Miller et al. |
| 2012/0136687 | A1 | 5/2012 | Tang et al. |
| 2012/0159499 | A1* | 6/2012 | Shafiee .................. G06F 9/5011 718/103 |
| 2013/0111479 | A1 | 5/2013 | Chen et al. |
| 2013/0111484 | A1 | 5/2013 | Chen et al. |

OTHER PUBLICATIONS

U.S. Appl. No. 13/285,713, 2 pages.
U.S. Appl. No. 13/285,780, 3 pages.
"Application Domain", Wikipedia en.wikipedia.org/wiki/Application_Domain, last modified on Sep. 14, 2011, accessed on Oct. 24, 2011, 2 pages.
"Application framework", Wikipedia, en.wikipedia.org/wiki/Application_framework, last modified on Aug. 27, 2011, accessed on Oct. 24, 2011, 2 pages.
"Cron Tutorial—Managing cron tab or cron job is easy!", Webmasters-central.com, webmasters-central.com/article-blog/tutorials/cron-tutorial-managing-cron-tab-or-cron-job-is-easy/, May 8, 2009, 10 pages.
"Optimize Transaction Performance and Improve Business Results", BMC Software, Inc., 2010, 25 pages.
"Task Scheduler", Microsoft, msdn.microsoft.com/en-us/library/windows/desktop/aa383614(d=printer,v=VS.85) . . . , accessed on Oct. 24, 2011, 4 pages.
Kafura, Dennis et al., "Scheduling Tasks with Critical Sections", Technical Report #76-3, IP.com, Inc., IPCOM000127996D, Dec. 31, 1976, 10 pages.
Kafura, Dennis et al., "Scheduling Tasks with Critical Sections", Technical Report #76-3, IP.com, Inc., IPCOM000148552D, Mar. 31, 1976, 21 pages.

\* cited by examiner

FIG. 3A

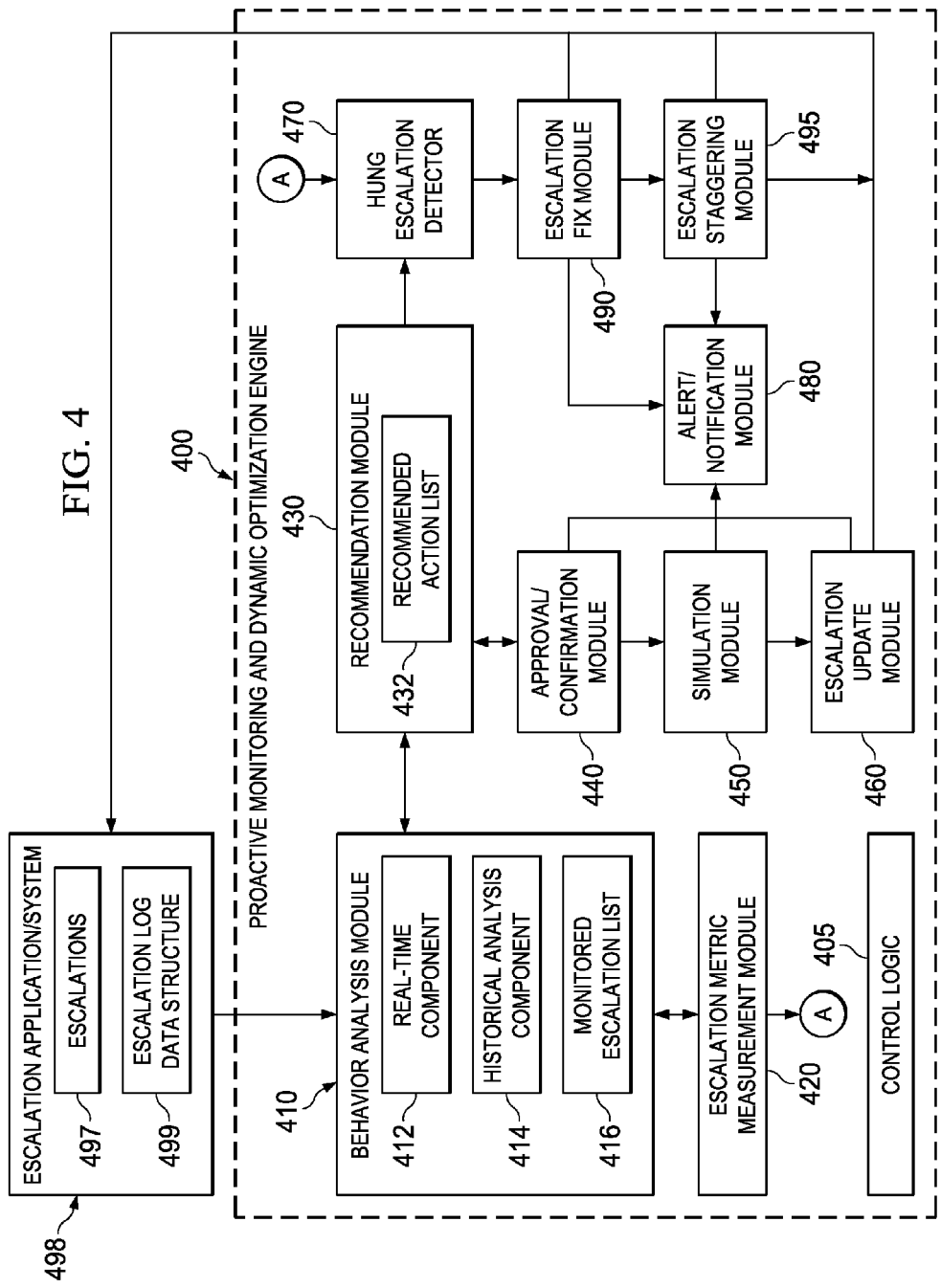

IDENTIFYING HUNG CONDITION EXCEEDING PREDETERMINED FREQUENCY THRESHOLD AND MODIFYING HANGING ESCALATION TASKS TO AVOID HANG CONDITIONS

This application is a continuation of application Ser. No. 13/285,780, filed Oct. 31, 2011, status allowed.

TECHNICAL FIELD

The present application relates generally to an improved data processing apparatus and method and more specifically to mechanisms for improving the performance of scheduled tasks via behavior analysis and dynamic optimization.

BACKGROUND

An escalation application provides a way to schedule tasks with configurable conditions to trigger actions and/or send notifications. The scheduled tasks with their associated configurable conditions, actions, and notifications are referred to herein as "escalations." That is, an escalation is a non-system scheduled task with triggering conditions that resides within an application domain. By "non-system" what is meant is that an escalation runs within the application, domain, or web container with which the escalation is implemented. An escalation can be reoccurring and enables automatic execution of actions or notifications when associated criteria is met, leveraging configuration data and security models defined in the application. An escalation can have escalation points, which are essentially sub-conditions that may be customizable to the particular implementer of the escalation. Thus, the escalation is a "super-condition" that must be met before the "sub-conditions" or escalation points, are evaluated.

Escalations may be scheduled to automatically run at specified time intervals, discrete time points, or the like. The escalations may be customized or tailored to a particular user's needs via the escalation application. An example of an escalation application may be, for example, an escalation application that monitors processes to make sure that critical processes are performed in a desired time period. Thus, an escalation may be a task that executes periodically to monitor the execution of processes, determine whether their execution times meet one or more criteria, and then perform one or more actions based on the one or more criteria being met or not, e.g., if the average execution time of a process is greater than a predetermined threshold, the escalation may increase a severity of a condition, issue a trouble ticket, send notifications to appropriate individuals, or perform other actions.

SUMMARY

In one illustrative embodiment, a method for processing work items that have not been completed by a first escalation is provided. The method comprises a computer determining that the first escalation failed to complete execution, processed fewer work items than the first escalation is configured to process, or completed execution beyond an allotted processing time. The method further comprises the computer duplicating the first escalation to form a second escalation. The method also comprises the computer configuring the second escalation to process the work items that have not been completed by the first escalation. In addition, the method comprises the computer disabling the first escalation and the computer activating the second escalation to process the work items that have not been completed by the first escalation.

In another illustrative embodiment, a computer system for processing work items that have not been completed by a first escalation is provided. The computer system comprises one or more processors, one or more computer-readable memories, and one or more computer-readable tangible storage devices. The computer system further comprises program instructions, stored on at least one of the one or more computer-readable tangible storage devices for execution by at least one of the one or more processors via at least one of the one or more computer-readable memories, to determine that the first escalation failed to complete execution, processed fewer work items than the first escalation is configured to process, or completed execution beyond an allotted processing time. Moreover, the computer system comprises program instructions, stored on at least one of the one or more computer-readable tangible storage devices for execution by at least one of the one or more processors via at least one of the one or more computer-readable memories, to duplicate the first escalation to form a second escalation. In addition, the computer system comprises program instructions, stored on at least one of the one or more computer-readable tangible storage devices for execution by at least one of the one or more processors via at least one of the one or more computer-readable memories, to configure the second escalation to process the work items that have not been completed by the first escalation. Furthermore, the computer system comprises program instructions, stored on at least one of the one or more computer-readable tangible storage devices for execution by at least one of the one or more processors via at least one of the one or more computer-readable memories, to disable the first escalation. The computer system also comprises program instructions, stored on at least one of the one or more computer-readable tangible storage devices for execution by at least one of the one or more processors via at least one of the one or more computer-readable memories, to activate the second escalation to process the work items that have not been completed by the first escalation.

In yet another illustrative embodiment, a computer program product for processing work items that have not been completed by a first escalation is provided. The computer program product comprises one or more computer-readable tangible storage devices and program instructions, stored on at least one of the one or more computer-readable tangible storage devices, to determine that the first escalation failed to complete execution, processed fewer work items than the first escalation is configured to process, or completed execution beyond an allotted processing time. The computer program product further comprises program instructions, stored on at least one of the one or more computer-readable tangible storage devices, to duplicate the first escalation to form a second escalation. The computer program product also comprises program instructions, stored on at least one of the one or more computer-readable tangible storage devices, to configure the second escalation to process the work items that have not been completed by the first escalation. In addition, the computer program product comprises program instructions, stored on at least one of the one or more computer-readable tangible storage devices, to disable the first escalation. Moreover, the computer program product comprises program instructions, stored on at least one of the one or more computer-readable tangible storage devices, to activate the second escalation to process the work items that have not been completed by the first escalation.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIGS. 3A and 3B provide an example diagram illustrating a graphical user interface that may be provided by an escalation application for defining and/or modifying an escalation in accordance with one illustrative embodiment;

FIG. 4 is an example block diagram of a proactive monitoring and dynamic optimization engine in accordance with one illustrative embodiment;

DETAILED DESCRIPTION

Figure 1:
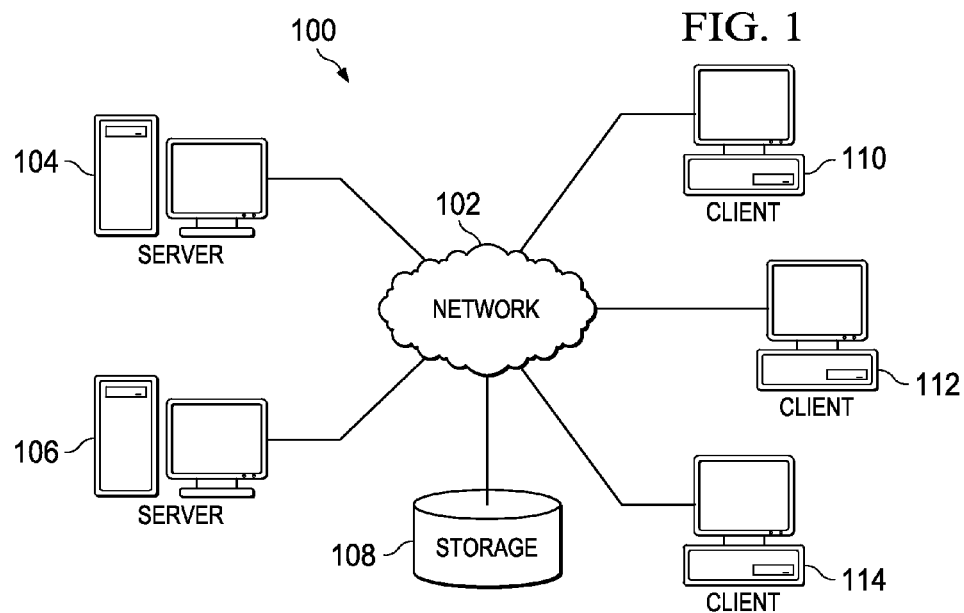
FIG. 1 is a pictorial representation of an example distributed data processing system in which aspects of the illustrative embodiments may be implemented.

There are times when scheduled tasks defined in an escalation application may not execute properly and may trigger an action, such as increasing a severity of an incident and issuing an incident ticket, due to an environment issue, heavy load on the system, or the like. For example, there are times when an escalation may hang due to various situations, e.g., an escalation that sends out a notification by connecting to an SMTP server may hang if the SMTP server is down or not responding, an escalation that issues a query to a database may hang if the database does not respond or if the query is complex and the database takes longer than an acceptable amount of time to respond, an escalation that executes but does not finish or does not process all of the required records, or the like. Illustrative embodiments recognize that scheduled tasks defined in an escalation application and not executing properly may cause an interruption in a user's business operations. Illustrative embodiments further recognize that, in a shared environment, scheduled tasks defined in an escalation application and not executing properly may impact all customers residing on the shared instance. Illustrative embodiments further recognize that these issues may be highly visible to upper management and typically require large problem determination efforts in order to resolve, often involving support teams, implementation/transition teams, system administrators, subject matter experts, and the like.

Currently, these issues are handled manually. That is, a system administrator or the like must manually verify the escalations are working properly. Illustrative embodiments recognize that this is quite time consuming, is reactive in nature, and may introduce human error.

The illustrative embodiments improve performance of scheduled tasks via behavior analysis and dynamic optimization. In the illustrative embodiments described herein, the scheduled tasks are escalations defined and managed via an escalation application although the invention is not limited to such and may be applied to any scheduled tasks whether they are escalations or other types of scheduled tasks. As mentioned above, escalations are non-system scheduled tasks with triggering conditions that reside within an application domain, can be reoccurring, and enable automatic execution of actions and/or notifications when the criteria of the escalation is met, leveraging configuration data and security models defined in the corresponding application with which the escalations are implemented. The illustrative embodiments proactively monitor and correct escalations. For example, the illustrative embodiments attempt to prevent failure or hanging of escalations by analyzing the behavior of the escalations and adjusting various parameters that will reduce the likelihood of escalation execution failure. If an escalation does fail, however, the illustrative embodiments detect such failure and provide remediation operations so that the escalation will start executing successfully again.

The illustrative embodiments provide an automated functionality for proactively monitoring escalations and dynamically optimize the escalation application. The dynamic and automatic monitoring/alert creation and automatic parameter adjustment features of the illustrative embodiments prevent high severity issues from being erroneously created and greatly enhance the overall escalation application performance. The illustrative embodiments further minimize or eliminate the manual effort involved in verification and modification of escalations, thereby also minimizing or eliminating human error.

Illustrative embodiments provide for performing behavior analysis on a collection of scheduled tasks, which for purposes of this description are assumed to be escalations of an escalation application. Based on this behavior analysis, a determination may be made as to whether an improvement may be made to the execution of the escalation, In response to such a determination, the improvement to the execution of the escalation may be automatically implemented using the illustrative embodiments, or a system administrator may be automatically prompted via an automatically generated notification to implement the identified improvement. Implementation of the identified improvement may involve providing the user with one or more options, e.g., via a menu or other user interface, for selecting whether to automatically apply the improvement immediately, automatically apply the improvement at a next execution of the escalation, or to schedule the automatic application of the improvement during a planned change window, i.e. a future time when changes to escalations may be made without significantly degrading the performance of the computing system.

In one illustrative embodiment, the automatic determination of an improvement to the execution of the escalation may include automatically detecting "hung" escalations, where a "hung" (non-responsive, stuck, failed, or the like) escalation is an escalation that fails to complete, fails to complete correctly by failing to process all data/records that the escalation was to process, or completes beyond an allotted processing time. For example, if an escalation is scheduled to run at an predetermined time interval N, then a hung escalation may be an escalation in which the current time is greater than the sum of a last run time+N interval+ delay value, where the delay value is a pre-determined value that is an estimate of how long it will take before an escalation will be detected as being "hung". The delay value may be pre-determined, may be calculated based on previous results of the execution of the escalation, historical analysis, e.g., average execution times, or the like.

In such a case, actions may be identified for reviving the hung escalation before the hung escalation causes a greater impact on application execution. For example, the hung escalation may be disabled, a new escalation similar to the hung escalation may be dynamically created that has similar execution criteria as the hung escalation, but modified to execute only on data or records that have not yet been processed by the hung escalation. This new escalation may then be enabled and activated such that the new escalation takes the place of the hung escalation, and such that the hung escalation is disabled and no longer used. In order to avoid missing data, the new escalation's condition is defined so that it starts from a last successful runtime and reprocesses the already processed records/data of the hung escalation as well as those records/data that were not processed by the hung escalation. In such a case, the already processed records/data may be automatically skipped by the new escalation in response to detecting that these records/data were already processed by the hung escalation, e.g., if the first 500 records were processed by the hung escalation, then the first 500 records would be skipped by the new escalation and the new escalation would begin processing at record 501.

In other illustrative embodiments, the behavior analysis may involve constructing a historical trend of monitored escalations. The historical trend of the monitored escalations may include such parameters as time taken to execute the escalation, amount of data or number of records affected by escalation execution, system toad at the time that the escalation executes, and the like. The historical trend may be analyzed and used to define a baseline for evaluation of escalation executions. The execution parameters of an escalation may be compared against these baselines to determine if modification to the escalation should be performed so as to improve the execution of the escalation and reduce the probability that the escalation will fail. These modifications may include dynamically adjusting a delay parameter associated with the escalation, dynamically adjusting an interval for execution of the escalation so as to stagger execution times of escalations, dynamically modifying the execution server of the escalation, dynamically modifying the execution condition criteria of the escalation, splitting an escalation into two or more escalations with various execution criteria that together comprise the criteria of the original escalation, and the like. Each of these illustrative embodiments will be described in greater detail hereafter with reference to the figures.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. Java and all Java-based trademarks and logos are trademarks or registered trademarks of Oracle and/or its affiliates. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 2:
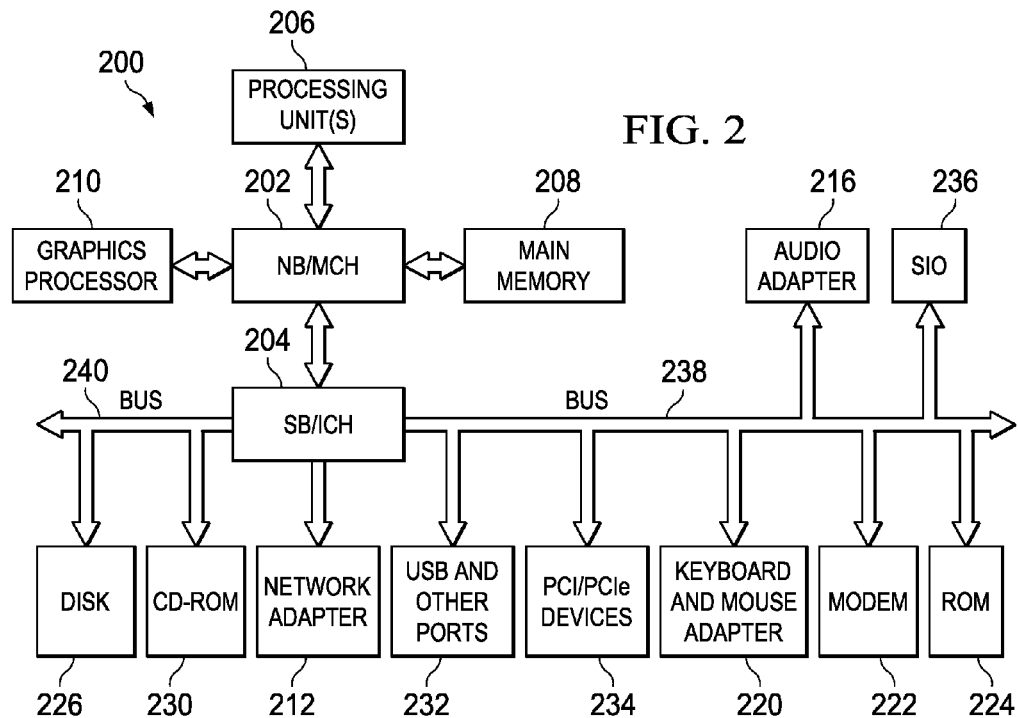
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Processing unit 206 may include one or more processors and may be implemented using one or more heterogeneous processor systems. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, universal serial bus (USB) ports and other communication ports 232, and PCI/PCIe devices 234 connect to SB/ICH 204 through bus 238. PCI/PCIe devices 234 may include, for example, Ethernet adapters, add-in cards, and PC cards for notebook computers. PCI uses a card bus controller, while PCIe does not. ROM 224 may be, for example, a flash basic input/output system (BIOS).

Hard disk drive (HDD) 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204 through bus 238.

An operating system runs on processing unit 206. The operating system coordinates and provides control of various components within the data processing system 200 in FIG. 2. As a client, the operating system may be a commercially available operating system such as Microsoft® Windows 7®. Microsoft, Windows, Windows NT, and the Windows logo are trademarks of Microsoft Corporation in the United States, other countries, or both. An object-oriented programming system, such as the Java™ programming system, may run in conjunction with the operating system and provides calls to the operating system from Java™ programs or applications executing on data processing system 200.

As a server, data processing system 200 may be, for example, an IBM® eServer™ System p® computer system, running the Advanced Interactive Executive (AIX®) operating system or the LINUX® operating system. Linux is a registered trademark of Linus Torvalds in the United States, other countries, or both. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 executing computer usable program code, which may be loaded into a memory such as, for example, main memory 208, ROM 224, and which may be stored on one or more storage devices, such as HDD 226 and CD-ROM drive 230.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, or an SMP system, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Referring again to FIG. 1, one or more of the computing devices in FIG. 1, e.g., server 104 and/or 106 may implement a service management device that may execute one or more service management applications for information technology service management. Such service management applications may include applications such as self-help for end users, full service desk incident, problem and change (IPC) management applications with service support, asset management, and the like. An example of the one or more service management applications with which the illustrative embodiments may be operate is the IBM Service Management (ISM) software suite available from International Business Machines Corporation of Armonk, N.Y. A service management suite is a set of applications and data structures that permit system administrators and other authorized personnel to monitor and manage the various services, business systems, data storage systems, and the like, of an organization and often provide a plurality of graphical user interfaces for facilitating such monitoring and management.

The incident, problem and change management applications of the service management system may implement one or more scheduled tasks and may provide an application for defining and managing these scheduled tasks. For example, in the illustrative embodiments described herein, these one or more scheduled tasks are escalations, i.e. a particular type of scheduled task as defined above, and the incident, problem and change management applications may implement an escalation application for defining and managing such escalations. It should be appreciated that while the illustrative embodiments will be described in terms of escalations and escalation applications, the illustrative embodiments are not limited to such and in other implementations may operate on other types of scheduled tasks other than escalations.

Figure 3A:
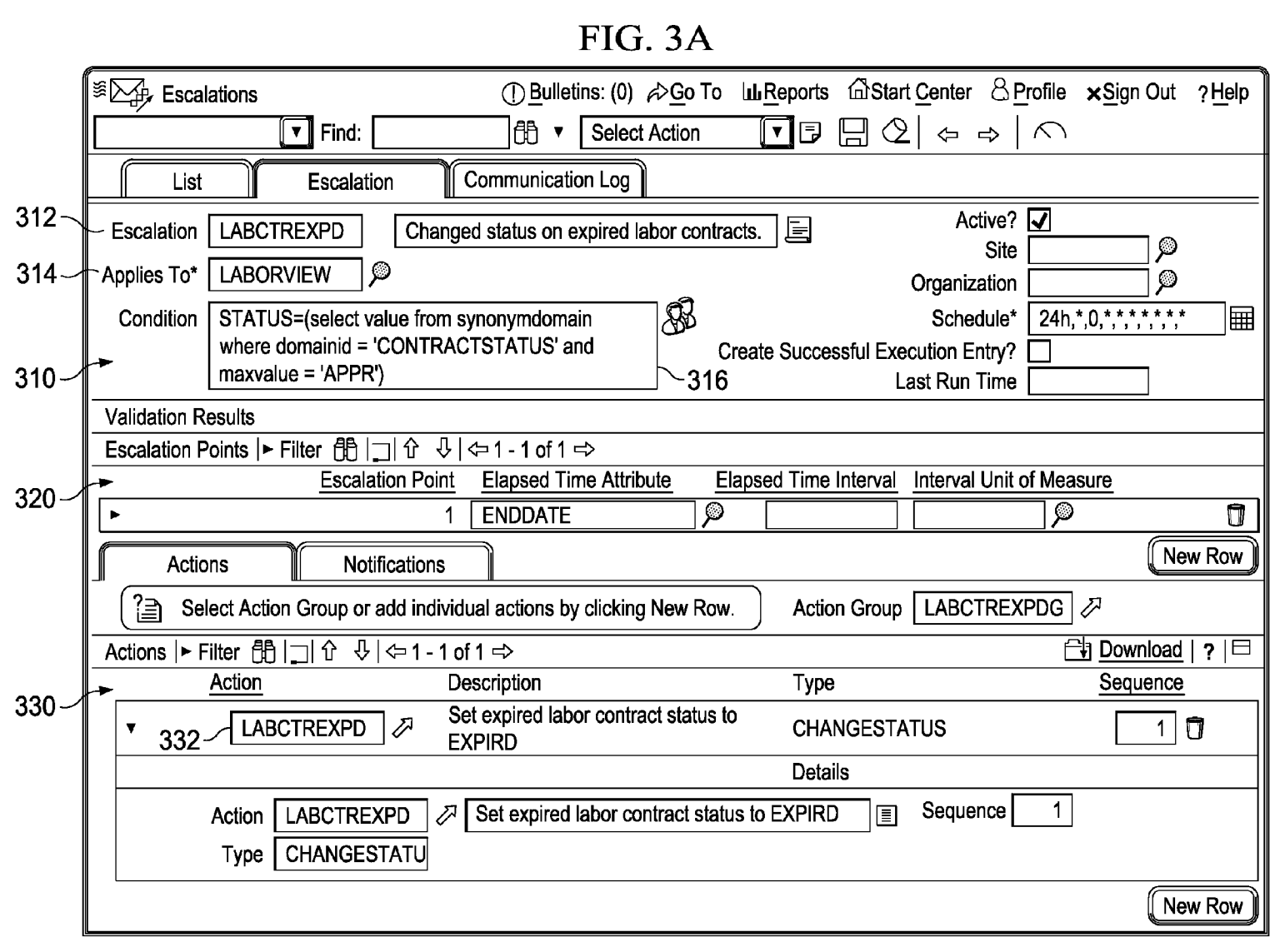
Figure 3B:
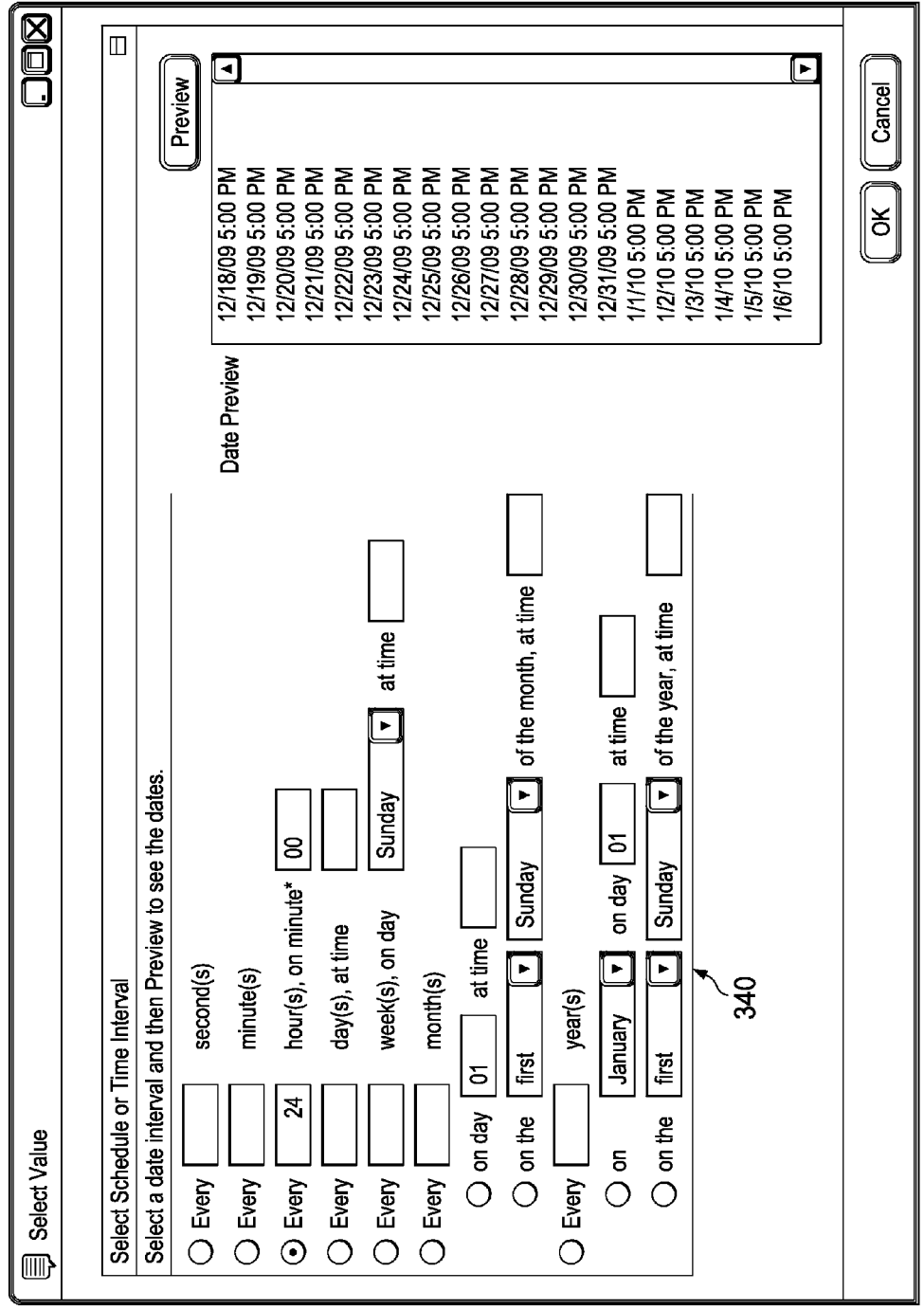

FIGS. 3A and 3B provide an example diagram illustrating a graphical user interface that may be provided by an escalation application for defining and/or modifying an escalation in accordance with one illustrative embodiment. The escalation being defined using the graphical user interface 300 of FIG. 3, in this example, is an escalation whose purpose is to change the status of expired labor contracts from an active status to an expired status. Many different types of escalations can be used without departing from the spirit and scope of the illustrative embodiments.

As shown in FIGS. 3A and 3B, the graphical user interface 300 comprises a first portion 310 for defining the name of the escalation 312, the target of the escalation 314, e.g., a target database, field of a database, or the like, a condition checked by the escalation 316, and the like. A second portion 320 of the graphical user interface 300 is provided for specifying escalation points and their elapsed time attributes. The escalation points are customer specific conditions that are a subset of the general escalation condition 316. A third portion 330 is provided for defining actions to be performed if the condition of the escalation 316 is met. In the depicted example, if the condition 316 is met, then the action "LABCTREXPD" 332, which is a change status type of action, is executed. This action sets an expired labor contract to EXPRD status. A fourth portion 340 is provided for defining the schedule of the escalation execution. In the depicted example, the escalation is executed every 24 hours and a preview of the execution times is shown in the fourth portion 340.

It should be appreciated that the graphical user interface 300 is only one example of a means for defining and modifying escalations. Other means for establishing escalations may be used without departing from the spirit and scope of the illustrative embodiments.

In accordance with the illustrative embodiments, as a further part of the incident, problem, and change management applications of the service management system, the illustrative embodiments provide a proactive monitoring and dynamic optimization engine. The proactive monitoring and dynamic optimization engine augments and enhances the capabilities of a service management system and its corresponding one or more service management applications by providing the various functionality described hereafter. The proactive monitoring and dynamic optimization engine may be implemented as software code stored on one or more storage devices and executed on one or more processors using associated hardware including one or more memories, buses, co-processors, or the like. In other illustrative embodiments, the proactive monitoring and dynamic optimization engine may be implemented in hardware or at least partially in hardware, such as firmware, application specific integrated circuits (ASICs), or the like. For purposes of the present description, it will be assumed that the proactive monitoring and dynamic optimization engine is implemented as program instructions, which may be stored in one or more computer-readable storage devices (e.g., HDD 226 or CD-ROM drive 230 of FIG. 2), and which may be executed by one or more processors (e.g., processing unit 206 of FIG. 2) of one or more data processing devices via one or more computer-readable memories (e.g., main memory 208 of FIG. 2).

The proactive monitoring and dynamic optimization engine includes a plurality of components for performing various operations including behavior analysis, load measurements, generating recommendations, performing simulations, updating escalations, staggering escalation execution times, detecting hung escalations, performing modifications to hung escalations, and the like. Each of these will be described in detail hereafter. The primary purpose of the proactive monitoring and dynamic optimization engine is to provide an automated facility for proactively monitoring escalations and dynamically optimizing the escalation application and its escalations.

FIG. 4 is an example block diagram of a proactive monitoring and dynamic optimization engine in accordance with one illustrative embodiment. The various elements of the proactive monitoring and dynamic optimization engine each have logic within them for performing the various operations attributed to them in the description hereafter. This logic may be provided as software logic (program instructions), hardware logic, or any combination of software and hardware logic. For purposes of this description, it will be assumed that the elements of the proactive monitoring and dynamic optimization engine are implemented as program instructions that are stored in one or more computer-readable storage devices (e.g., HDD 226 or CD-ROM drive 230 of FIG. 2 and that are executed by one or more processors (e.g., processing unit 206 of FIG. 2) of one or more data processing devices via one or more computer-readable memories (e.g., main memory 208 of FIG. 2).

As shown in FIG. 4, the proactive monitoring and dynamic optimization engine 400 includes a behavior analysis module 410, an escalation metric measurement module 420, a recommendation module 430, an approval/confirmation module 440, a simulation module 450, an escalation update module 460, a hung escalation detector 470, an alert/notification module 480, an escalation fix module 490, and an escalation staggering module 495. The proactive monitoring and dynamic optimization engine 400 interacts with and works in conjunction with escalation application 498. Control logic 405 is provided in the proactive monitoring and dynamic optimization engine 400 for controlling the overall operation of the proactive monitoring and dynamic optimization engine 400 and orchestrating the operation of the other elements 410-495 of the proactive monitoring and dynamic optimization engine 400.

The behavior analysis module 410 determines whether dynamic optimization and performance improvement is warranted for one or more escalations identified in a monitored escalation list data structure 416 that identifies the particular escalations 497 defined by and managed by the escalation application 498 that are to be analyzed for purposes of determining whether dynamic optimization and performance improvements are to be performed. The particular escalations 497 that are in the monitored escalation list data structure 416 may be identified or selected from the escalation application 498 by a system administrator or other authorized user. The behavior analysis module 410 performs evaluations on behavior information obtained from the execution of these various escalations and determines a list of recommended actions to be performed to optimize and improve performance of these escalations. The behavior information may be obtained, by the escalation metric measurement module 420, from the execution of the escalations in a production environment.

The escalation metric measurement module 420 may collect execution metrics for escalations, which may include all of the escalations 497 defined and managed by the escalation application 498 or only those escalations in the monitored escalation list data structure 416. These collected metrics are used as a basis for performing the behavior analysis by the behavior analysis module 410. Such metrics may include a number of transactions evaluated by an escalation, execution times of an escalation, for which users and/or client applications an escalation is executed, etc. These metrics may be obtained, for example, from an escalation log data structure 499 maintained by the escalation application 498. That is, the escalation application 498 may monitor the execution of escalations 497 and store, in the escalation log data structure 499, information regarding the times when escalations 497 are executed, for which users/client applications the escalations 497 are executed, how long the executions of the escalations 497 took to complete, how many times the escalations 497 are executed for each user/client application, a last run time of the escalations 497 for each user/client application, and other log information that may be later used by the behavior analysis module 410 to perform behavior analysis of the various escalations 497. While FIG. 4 shows the escalation log data structure 499 as a separate data structure, in other illustrative embodiments, the escalation log data structure 499 may be incorporated into a database that is the target of at least one of the escalations 497. It should be further appreciated that any configurable parameter of at least one of the escalations 497, as well as any system parameters, e.g., CPU, memory, etc., may be used by the behavior analysis module 410 to perform its operations as described herein.

The behavior analysis module 410 performs both real-time and historical analysis on the measured escalation metrics to determine whether to dynamically optimize or improve the performance of the execution of the escalations. Thus, the behavior analysis module 410 comprises a real-time analysis component 412 and a historical analysis component 414. Various real-time and historical behavioral analyses may be performed by the behavior analysis module 410.

A real-time behavioral analysis that the real-time analysis component 412 of the behavior analysis module 410 may perform is to interrogate the monitored escalation list data structure 416 to determine which escalations have a relatively large number of database transactions evaluated by the escalation, relatively large response times, or the like, where "relatively large" may be determined based on a comparison of a number of database transactions evaluated by the escalation to one or more predetermined thresholds defining the border between what is considered a relatively small or normal number of database transactions and a relatively large number of database transactions. Such a threshold may be implementation dependent and may be set by a system administrator or other authorized user. This threshold information may be correlated with the configured action of the escalation point of the escalation and the target database, database fields, or the like. In this way, the escalations that are most database intensive may be identified by real-time analysis component 412 as candidates for automatically splitting the escalation so as to reduce the load on the escalation application and the target database.

For example, if an escalation dealing with the data/records associated with users A, B, and C always takes a time to complete that is beyond a predetermined threshold, and real-time analysis component 412 determines that user A's corresponding escalation action shows a number of database transactions in the escalation log data structure 499 of the escalation application 498 that is beyond a predetermined threshold, then execution conditions applying to user A can be automatically removed, such as by escalation update module 460 for example, into a separate escalation with appropriate scheduled run times. That is, rather than the escalation operating on all of the user's A, B, and C database transactions/database records collectively, a separate escalation may be automatically generated, such as by escalation update module 460 for example, that mirrors the original escalation but operates only on user A's database transactions/database records as the target. In addition, the target of the original escalation may be modified, such as by escalation update module 460 for example, to only operate on the database transactions/database records of users B and C.

The real-time behavioral analysis component 412 may detect such conditions (e.g., that an escalation dealing with the data/records associated with users A, B, and C always takes a time to complete that is beyond a predetermined threshold and that user A's corresponding escalation action shows a number of database transactions in the escalation log data structure 499 of the escalation application 498 that is beyond a predetermined threshold) and flag them by adding an appropriate recommended action to the recommended action list data structure 432 maintained by the recommendation module 430 to perform such an escalation splitting action. The recommended action may actually comprise multiple recommended actions, e.g., one recommended action to modify the target of the original escalation and another recommended action to create a new escalation corresponding to the original escalation but with the target being different from the original escalation.

The historical analysis component 414 may perform various historical behavioral analyses. For example, the historical analysis component 414 may analyze a historical trend to create a baseline of escalation completion times over a period of time and determine if a delay value associated with an escalation is appropriate for optimum performance of the escalation. Whether a delay value associated with an escalation is appropriate for optimum performance of the escalation may be determined by historical analysis component 414 by comparison against one or more predetermined thresholds. Based on this historical trend analysis, the delay value associated with an escalation may be updated by historical analysis component 414 upon detecting spikes or the like.

For example, consider an escalation (Esc123) that has a lag that various through the day as follows:
  at 6:00 am : 5 minute run time, finishes in 2 minutes
  at 1:00 pm : 5 minute run time, finishes in 10 minutes
  at 5:00 pm : 5 minute run time, finishes in 6 minutes
From this escalation execution metric information, which again may be collected by the escalation metric measurement module 420 and provided as input to the behavior analysis module 410, historical analysis component 414 may calculate an escalation baseline and validate the escalation baseline against a configurable threshold, e.g., 80% meaning that the baseline is 80% of the measured escalation execution time. For example, if Esc123 has an average runtime for a given day of 6 min; (6+10+2)/3, an 80% threshold would be approximately 7.2 minutes (baseline+20%). The configurable threshold may be configured based on various criteria including current loading of the system or the like.

Based on the validation against the threshold, an appropriate recommended action to adjust one or more of the run time and/or the delay value may be determined by historical analysis component 414 in order to optimize the performance of the escalation. For example, if the execution time of Esc123 in the above example is above 7.2 minutes, an appropriate recommended action may be generated by historical analysis component 414. For example, an appropriate recommended action may be to stagger or reschedule the execution of the escalation to improve overall execution time of the escalation. This may involve rescheduling the escalation's execution to a time during off-peak, i.e. lighter load, of the system, adjusting a delay or runtime interval, or optimizing the condition of the escalation to improve overall run time. The recommended action may be added to the recommended action list data structure 432 maintained by the recommendation module 430.

As another example of a history analysis that may be performed by the historical analysis component 414, the historical analysis component 414 may detect conditions indicative of a need to monitor particular escalations that may not already be listed in the monitored escalation list data structure 416. If such a condition is determined to be present, the corresponding escalation may be automatically added, by the historical analysis component 414, to the monitored escalation list data structure 416. In one illustrative embodiment, the condition indicative of a need to add a particular escalation to the monitored escalation list data structure 416 is a condition in which an escalation fails consistently or periodically with a predetermined threshold amount of frequency, where failure of an escalation means that the escalation is hung, does not complete its execution on all records/data it is intended to processor, does not execute at all, or otherwise did not produce expected results.

The escalation log information in the escalation log data structure 499, for escalations that are defined and managed by the escalation application 498 and which are not already listed in the monitored escalation list data structure 416, may be periodically analyzed by the historical analysis component 414 to determine if the escalation log information for one or more of the escalations meets the condition criteria indicative of a need to add the escalation to the monitored escalation list data structure 416. For example, if the escalation log information for a particular escalation indicates that the escalation fails consistently or periodically with at least a predetermined threshold frequency, the escalation may be identified by the historical analysis component 414 as one that needs to be monitored more closely and should be added to the monitored escalation list data structure 416.

A determination as to whether the escalation log information for a particular escalation indicates that the escalation fails consistently or periodically with at least a predetermined threshold frequency may be made, for example, by the historical analysis component 414 querying escalation log information parameters such as "schedule", "last run time", and "status" at periodic intervals with minimal performance impact. A count of the number of times the "status" of the escalation is indicative of a failed escalation may be maintained by the historical analysis component 414 for each of the escalations for which there is escalation log information. The count may be maintained for a predetermined period of time at the end of which the count may be reinitialized to a starting value. If the count exceeds a predetermined threshold value, then the escalation is identified by the historical analysis component 414 as one that needs to be more closely monitored by adding the escalation to the monitored escalation list data structure 414. An appropriate action for adding the escalation to the monitored escalation list data structure 416 may be added, by the historical analysis component 414 for example, to the recommended action list data structure 432 maintained by the recommendation module 430 in such a case.

Yet another type of historical analysis that may be performed by the historical analysis component 414 may be to determine whether dividing or splitting an escalation would improve performance beyond a configured threshold and then generate an appropriate recommended action to perform such division or splitting. This historical analysis may be based on a calculated processing time and amount of data/number of records processed by an escalation. Essentially, in performing this historical analysis, historical analysis component 414 looks at the various optional schedules for an escalation, determines the amount of data/number of records processed under each optional schedule and the amount of processing time needed to execute the escalation under these optional schedules, and determines whether a run time interval should be modified in the current schedule of the escalation. That is, the current escalation may have been defined in accordance with conditions that have changed since the current escalation's instantiation which result in the performance of the escalation becoming less efficient. For example, the load of the escalation, e.g., number of records processed, capacity of the target of the escalation, and the like, may have changed causing the processing time to saturate and peak out after processing a smaller amount of data/number of records. Thus, if the escalation is still operating on a larger amount of data/number of records between scheduled run time intervals, the execution of the escalation becomes less efficient. The historical analysis component 414 may identify such situations from the historical analysis and generate recommended actions to improve the performance of the escalation by dividing or splitting the escalation such that more instances of the escalation are executed on a more frequent basis on a smaller amount of data/number of records.

For example, assume that an escalation is set to execute with a run time interval of every 2 hours, and the execution of this escalation results in the following historical trend over a 1 week period:

Number of records processed: average of 10,000 records
Processing time: average of 90 minutes Assume also that a similar escalation, as may be determined by various characteristics of the escalation including the escalation operating on a same number of records/data, targeting a same set of database objects, executing for a same customer/implementer of the escalation, or the like (similarity may be determined by applying escalations against the target database objects/data set, generating counts and analyzing conditions of the escalations to determine which escalations are similar), at a run time interval of every 30 minutes, has a historical trend that yields a better processing time as follows:

Number of records processed: average of 5,000 records
Processing time: average of 20 minutes In other words, with the current escalation being analyzed, 10,000 records are processed in 90 minutes of processing time while in the similar escalation, 22,500 records may be processed in 90 minutes of processing time by reducing the run time interval to every 30 minutes and operating on relatively smaller amounts of data/numbers of records during each execution. From this, the historical analysis component 414 may determine that the current escalation under analysis may be divided or split into additional instances of the escalation in a schedule of the execution of the escalation. That is, since the similar escalation obtains a shorter processing time when run at a shorter run time interval, then a similar trend may be expected with the current escalation if it is divided and split into additional escalation instances that are executed every 30 minutes as opposed to every 2 hours. As a result of such a determination, the historical analysis component 414 may generate an appropriate recommended action to modify the run time interval of an escalation. For example, a recommended action may be to reduce the run time interval to a smaller interval and to adjust the escalation's scheduled to reflect the new run time interval.

It should be appreciated that while the above embodiments are described in terms of splitting an escalation based on the number of records processed and execution time of a similar escalation, the illustrative embodiments are not limited to such. Rather, splitting of escalations may be performed based on timestamps, status, ownergroup, or any other attribute included in the escalation condition.

Thus, the behavior analysis module 410 analyzes the behavior of escalations as identified by the escalation execution metric information that is generated by the escalation application 498 by monitoring escalation executions and that is collected by the escalation metric measurement module 420. The escalation metric measurement module 420 gathers such metric information from the escalation log data structure 499 and may also perform some pre-processing of this metric measurement data to provide data useful for the analysis of behavior by the behavior analysis module 410. The escalation metric measurement module 420 may also gather load, system, and application data for systems and applications across application and database servers, including replica database servers. System data may include CPU, disk I/O, process, and other data indicative of the operation of the hardware systems. Application data may include concurrent user, heap, paging, and JVM metrics, for example. This information together may be indicative of a load on the systems and may be correlated, such as by the escalation metric measurement module 420 for example, with escalation execution time in order for historical analysis component 414 to make recommendations as to how to improve the execution of an escalation, e.g., if an escalation execution is slow because a system is heavily loaded, rescheduling of the escalation may be recommended as opposed to splitting the escalation.

The behavior analysis module 410 performs one or more real-time behavioral analysis of the escalation metric measurements and/or one or more historical behavioral analysis of the escalation metric measurements, and generates one or more recommended actions that are inserted or added, by the behavior analysis module 410, to a recommended action list data structure 432 maintained by the recommendation module 430. The recommended actions may comprise actions for adjusting delay values, run time intervals, targets, and other parameters of escalations, splitting an escalation, generating new escalations, and the like.

Recommended actions in the recommended actions list data structure 432 of the recommendation module 430 are submitted to an approval/confirmation process via the approval/confirmation module 440. That is, the approval/confirmation module 440 may present the recommended actions to a system administrator or other authorized user via one or more user interfaces such that the authorized user is able to approve/confirm/deny the recommended action. The one or more user interfaces may be presented to the authorized user in any one or more of a plurality of different ways including a web page accessed by the authorized user, an application present on a computing device used to generate an output based on notifications sent by the recommendation module 430, an electronic mail communication transmitted to the authorized user's computing device, a SMS communication transmitted to the authorized user's computing device, or the like.

The authorized user may respond to such notifications of recommended actions via the user interface to authorize/confirm or deny execution of the recommended action. If a recommended action is authorized/confirmed, then a corresponding indication of this authorization may be added, by the approval/confirmation module 440, to the recommended action list data structure 432. Similarly, if the recommended action is a denial of the recommended action, a corresponding indication of this denial may be added, by the approval/confirmation module 440, to the recommended action in the recommended action list data structure 432.

In one illustrative embodiment, the presentation of the recommended actions to the user for approve/confirm/deny the recommended action may further provide the user with options to apply the recommended action immediately, apply the recommended action at a next execution of the escalation, apply the action at a later scheduled time, or the like. For example, if a user selects to apply the action at a later scheduled time, the later scheduled time may be a time of relatively lower load on the system or a predetermined change window time. An indication of the user's selection to approve/confirm/deny the recommended actions, whether to apply the recommended actions immediately, at a next execution, or at a later scheduled time, and the like, may be stored by approval/confirmation module 440 in association with an identifier of the recommended action for later analysis.

In addition, the approval/confirmation module 440 may store a list of pre-approved recommended actions that may be used to automatically approve/confirm particular recommended action types. Thus, when a recommended action is inserted or added to the recommended action list data structure 432, the type of the recommended action, e.g., a run time interval modification, delay value modification, escalation split, or the like, may be compared to the pre-approved recommended action types. If there is a match between the type of the recommended action added to the action list and one of the pre-approved recommended action types, then the recommended action that is added to the action list may be automatically authorized/confirmed and a corresponding indicator may be added, by the approval/confirmation module 440, to the recommended action list data structure 432 in association with the recommended action.

The simulation module 450 periodically accesses the recommended actions list data structure 432 of the recommendation module 430, and retrieves the recommended actions that have been authorized/confirmed as indicated by the authorized/confirmed indication in association with the recommended actions in the recommended actions list of the recommendation module 440. The simulation module 450 may also remove those recommended actions in the recommended actions list data structure that have been denied, as indicated by an associated denial indicator, or that have become stale as simulation module 450 may determine from a timestamp associated with the recommended action and one or more thresholds.

For the recommended actions that have been authorized/confirmed, the simulation module 450 may simulate the recommended action, in a test environment, to determine whether the recommended action should be committed to the escalation application. That is, the simulation module 450 monitors the execution of a modified or new escalation, generated, by the escalation update module 460, as a result of the application of a recommended action, in a test environment, and the simulation module 450 determines whether the execution of the modified or new escalation constitutes an improvement in the execution of the escalation over the original, unmodified escalation. This simulation may be performed on a simulated system, virtual machine, development instance, or the like, of the database or other system with which the escalation application 498 operates. Infrastructure, security, and network access is in place to support such simulations and to obtain results of such simulations such that the results may be presented to simulation module 450 for automated analysis and/or an authorized user for review prior to committing the recommended actions to the escalations of the escalation application 498.

For example, simulation module 450, in performing the automated analysis, may obtain results of the simulation of the modified escalation to determine the measured performance of the modified escalation. The measured performance of the modified escalation as obtained from this simulation may be compared to the actual baseline performance measurements of the current escalation (described above) to determine if a significant enough improvement in performance is achieved by implementing the recommended action, where significance of the improvement may be measured according to one or more threshold values, e.g., a 20% improvement (reduction) in processing time required to execute the escalation, a 25% improvement (increase) in amount of data or number of records processed by the escalation within a given period of time, or any of a plethora of other possible threshold values or combinations of threshold values. The result is a set of one or more decisions as to whether to commit the recommended action to the identified escalation in the escalation application 498.

Such evaluations may be done using an automated tool. In other cases, such determinations may be made by a system administrator or other authorized user in which case the results of the simulation may be output to the system administrator, optionally in combination with baseline performance measurements, and the system administrator/authorized user may indicate via a user interface whether the recommended action should be committed to the escalation in the escalation application 498.

Based on the determination as to whether to commit the recommended action or not, a commit identifier may be added, by the control logic 405 or other appropriate logic in the proactive monitoring and dynamic optimization engine 400, to the entry in the recommended action list data structure 432. This identifier is a flag to the escalation update module 460 to either perform the update on the escalation or not when a scheduled update of escalations occurs. That is, the escalation update module 460 may periodically interrogate the recommended action list data structure 432 for recommended actions that have their commit identifier set to a value indicative of a need to commit the action to the escalation in the escalation application. For those recommended actions in the recommended action list data structure 432 having a set commit identifier, the escalation update module 460 performs operations in conjunction with the escalation application 498 to modify, split, create, remove, or the like, the corresponding escalation in the escalation application. In order to perform such operations, the escalation update module 460 takes into consideration the production environment which may require change tickets to be generated, request a change window of time in which to perform the changes, etc.

In some instances, the escalation update module 460 may dynamically switch the virtual machines, processors, or other resources on which the escalation runs in order to perform load balancing as well. That is, relative loads on the various virtual machines run by the system associated with the escalation application 498 may be monitored and if a virtual machine is determined to be relatively less loaded than other virtual machines, escalations whose modifications are indicative of a lower performance due to processor time or the like, may be migrated by escalation update module 460 to the virtual machines having relatively lower loads.

In addition to the detection of the possible need for modifications to escalations based on real-time and historical trend analysis of the execution performance information of the various escalations, the illustrative embodiments further provide another real-time analysis for detecting "hung" escalations, as previously defined. The illustrative embodiments provide logic for detecting such hung escalations and correcting them to avoid the hung condition. The embodiments for detecting and correcting hung escalations may operate separate from the other embodiments described above or may operate in conjunction with these other embodiments in either a parallel or serial manner. Thus, in some illustrative embodiments, the detection and correction of hung escalations may be performed at substantially a same time as the other behavioral analysis and update of escalations previously described. Other illustrative embodiments for detecting and correcting hung escalations may operate on results of the behavior analysis generated by embodiments described above, the simulation results generated by the simulation module 450, or the like, in a more serial manner.

The hung escalation detection logic may be embodied in a hung escalation detector 470, for example, which is responsible for detecting escalations that either do not complete (fail) or complete beyond one or more predetermined allotted processing time threshold. The hung escalation detector 470 may store one or more predetermined allotted time processing thresholds which are used as a basis for comparison against measured processing time metric information gathered by the escalation metric measurement module 420 from the escalation log data structure 499 of the escalation application 498. The one or more predetermined allotted processing time thresholds may be associated with different types of escalations such that one escalation in the escalation application 498 may have a different corresponding predetermined allotted processing time threshold than another escalation in the escalation application 498. These predetermined processing time thresholds may be automatically generated, such as by the behavior analysis module 410 for example, based on baseline calculations performed by the behavior analysis module 412 as described above, or may be user defined and set in the hung escalation detector 470.

The hung escalation detector 470 may analyze the measured metric information gathered by the escalation metric measurement module 420 to identify any escalations that did not complete correctly, as may be determined from the escalation log data structure 499, a "post-verification" check of the execution of the escalation, or the like. Those escalations identified as not having completed correctly have an associated recommended action added to the recommended action list data structure 432 of the recommendation module 430 (if one is not already present), with a corresponding "hung" identifier set in the recommended action entry or an already existing recommended action for this escalation is further updated to have the hung identifier set indicating that the escalation is hung and needs to be corrected.

In addition, the hung escalation detector 470 detects escalations that complete, but complete beyond an allotted processing time threshold. For example, if an escalation is scheduled to execute at N time intervals (e.g., every 2 hours, every 30 minutes, etc.), then the hung escalation detector 470 may determine if the sum of the last run time (as determined from the escalation metric measurements obtained from the escalation log data structure), plus the N interval, plus a delay value is greater than a corresponding allotted processing time threshold for the type of escalation. If so, then hung escalation detector 470 determines that the escalation is hung. If not, then the escalation is not hung. If the escalation is determined to be hung because it completes in a time that is greater than the allotted processing time threshold for that type of escalation, then hung escalation detector 470 may generate and/or update a recommended action such that the "hung" identifier is set in the recommended action entry.

For example, assume that the current time is 19:00 UTC and an escalation is scheduled to run every 6 hours, starting at 6:00 UTC (i.e. 6, 12, 18, and 24). The last run time is determined to be 12:00 UTC and the delay allowed (delay value) is 30 minutes. The last run time should be between 18:00 and 18:30 UTC. If the actual last run time of the escalation is determined to be earlier than 18:00, then it may be determined that the escalation failed to complete and thus, is considered hung. If the last run time+the interval (6 hours)+the allowed delay (delay value of 30 minutes) is greater than a threshold, e.g., 19:00 UTC, then the escalation may be determined to be hung due to it taking a longer than allotted processing time to complete.

In addition, the hung escalation detector 470 may further detect situations where an escalation completes within the allotted processing time threshold for the type of escalation, but the defined action in the escalation is not performed, e.g., data is not updated, a record in a database is not updated, a notification is not sent, etc. The hung escalation detector 470 comprises logic for cross-checking the results of the actions defined in the escalations against the escalation execution log data structure 499 to detect such situations and identify them as hung escalations, i.e. perform a "post-verification" check operation that verifies that the escalation completed correctly. As with the embodiments described above, in such a situation an appropriate recommended action may be added by hung escalation detector 470 to the recommended action list data structure 432 and/or the recommended action may be updated to have its hung identifier set.

The escalation fix module 490 periodically interrogates the recommended action list data structure 432 for recommended actions having the hung identifier set. For those escalations corresponding to recommended actions having a hung identifier set, the escalation fix module 490 may perform a process for fixing the escalation to avoid the hung condition. Such fixes may include splitting the escalation, modifying parameters of the escalation, and/or the like. Filters may be applied to the recommended actions that have their hung identifiers set such that not all of these recommended actions are necessarily fixed by the escalation fix module 490. For example, a filter of a run interval of less than 30 minutes may be used as a basis for filtering the recommended actions with the hung identifier set. That is, only recommended actions with a hung identifier set and that are associated with escalations having a run interval of 30 minutes or less are fixed by the escalation fix module 490 in this example. Any filter criteria or no filter criteria may be used without departing from the spirit and scope of the illustrative embodiments.

In one illustrative embodiment, the escalation fix module 490 may operate by duplicating the existing escalation, renaming the new escalation using a standardized naming convention, updating escalation conditions of this new escalation to work only on the target data/records that were not yet processed by the original escalation, disabling the hung escalation, and enabling/activating the new escalation.

In one illustrative embodiment, as with the other recommended actions noted above, the modifications to be performed by the escalation fix module 490 may be submitted as recommended actions which are then approved/confirmed/denied via the approval/confirmation module 440. Thus, an automated process or authorized user may need to authorize the modifications or "fixes" performed by the escalation fix module 490 prior to the modifications or fixes being committed. The simulation module 450 may likewise be used to simulate the modifications or fixes prior to the modifications or fixes being committed. Alternatively, the escalation fix module 490, due to the nature of the hung condition being different from the more "optional" modifications of the other behavioral based recommended actions, may operate outside of the approval/confirmation module 440, simulation module 450, and escalation update module 460 and may operate automatically in response to the detection of hung escalations.

It should be noted that when a recommended action is completed, the corresponding recommended action may be removed by a cleanup operation from the recommended action list data structure 432. In addition, a cleanup operation may be run periodically or at scheduled times to remove recommended actions that have become stale, i.e. have not been committed within a predetermined period of time. In this way, the recommended action list data structure 432 may be maintained.

The escalation staggering module 495 operates to minimize hung escalation situations and to improve performance of escalations by staggering the run times of the escalations by modifying the schedules of the escalations. That is, escalations having a similar schedule and run interval are identified and their schedules and run intervals are updated or modified so as to stagger them. The similar schedules and run intervals may be determined in accordance with a configuration file (not shown) or the like, associated with the proactive monitoring and dynamic optimization engine 400, that stores information about the configuration of the escalations including their scheduled execution times and time intervals.

In one illustrative embodiment, the escalation staggering module 495 may operate to determine, from the configuration file, a number of escalations scheduled for simultaneous execution in a time interval in a production environment. The escalation staggering module 495 may divide the time interval by the number of escalations to form a shorted time interval and then may reschedule execution of the number of escalations in the production environment such that a plurality of subsets of the number of escalations execute in a staggered order according to the shortened time interval. A subset may be a subset of the escalations that all share a common characteristic, such as a frequency at which the escalations in the subset failed to complete execution or completed execution beyond an allotted processing time, a load, a customer, a notification, a service level agreement, and a database object.

Furthermore, before rescheduling the execution of the number of escalations in the production environment, the escalation staggering module 495 may reschedule the execution of the number of escalations in a test environment. This may be done in response to a determination that performance of the rescheduled execution of the number of escalations in the test environment is improved over performance of simultaneous execution of the number of escalations in the production environment.

For example, assume that the starting time is the same for escalations 1, 2, 3, 4, and 5 and the each of these escalations is set to run every 10 minutes. Without staggering the schedules of these escalations, each of these escalations would be scheduled to execute at the same time or substantially a same time and run for substantial a same amount of time. This may cause the performance of these escalations to be less than optimal.

The escalation staggering module 495 staggers the schedules of these escalations such that the start times of these escalations are not identical. For example, escalation 1 may have a start time at minute 0, escalation 2 may have a start time at minute 2, and escalation 3 may have a start time at minute 4, etc. Each escalation will still run every 10 minutes, but with different starting times. Thus, the staggered schedule provides less load on the system and allows for improved performance of the escalations. The affects of such staggering are exponential with large numbers of escalations having same or similar run time intervals and start times.

Moreover, the escalation staggering module 495 may classify escalations according to escalation types and then stagger the escalations according to classification. For example, escalations may be classified into predetermined classifications based on such characteristics as hung frequency, load, customer, notification, SLA, target, or the like. With such groupings, for example, notification escalations may be scheduled for minute 0, SLA escalations may be scheduled for minute 2, object "WORKORDER" escalations may be scheduled for minute 4, and the like.

The alert/notification module 480 automatically generates notifications and transmits them to computing devices associated with authorized users so as to inform them of conditions, actions, and the like, occurring in the proactive monitoring and dynamic optimization engine 400. Such notifications may take many different forms including, but not limited to, electronic mail notifications, paging notifications, SMS notifications, automated telephone calls, instant messaging notifications, displaying user interfaces, and the like.

Thus, the illustrative embodiments provide mechanisms for automatically improving the performance of escalations based on behavioral analysis of the escalations. This behavioral analysis comprises real-time behavioral analysis, historical trend behavioral analysis, and hung escalation analysis. As noted above, while the illustrative embodiments are described with regard to escalations, the illustrative embodiments may be applied to any computing system in which the execution behavior of scheduled tasks may be analyzed using the illustrative embodiments and appropriate recommended actions for improving the performance of these scheduled tasks may be generated and committed.

Figure 5:
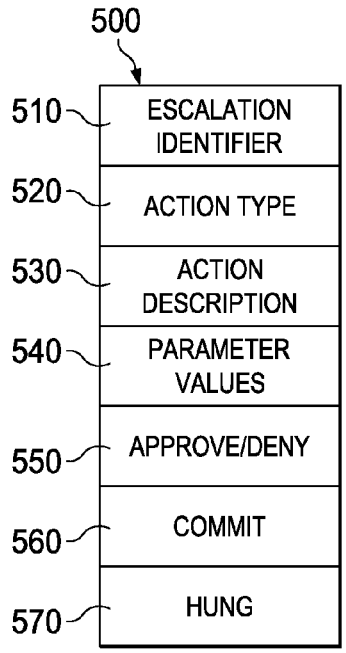
FIG. 5 is an example diagram of one recommended action list entry that may be used with this recommended action list data structure in accordance with one illustrative embodiment.

As discussed above, one of the principle data structures utilized by the illustrative embodiments is the recommended action list data structure 432 of the recommendation module 430. FIG. 5 is an example diagram of one recommended action list entry that may be used with this recommended action list data structure in accordance with one illustrative embodiment. As shown in FIG. 5, the recommended action list entry 500 includes a field 510 specifying an identifier of an escalation with which the recommended action is associated. A second field 520 is provided for specifying the type of recommended action, e.g., splitting of the escalation, modifying a run time interval of the escalation, modifying a delay value of the escalation, modifying a target of the escalation, etc. A third field 530 is provided for specifying a description of the recommended action and the basis for the recommended action. A fourth field 540 is provided for specifying the parameter values, if any, of the escalation and their corresponding updated values should the recommended action be committed. A fifth field 550 is provided for specifying an approval/denial of the recommended action, this field being set via the approval/confirmation module 440 as described above. A sixth field 560 is provided for specifying whether or not to commit the recommended action. This field may be set by simulation module 450 as described above. A seventh field 570 is provided for specifying whether the recommended action is associated with a hung escalation. This field may be set by the hung escalation detector 470 as described above.

Figure 6:
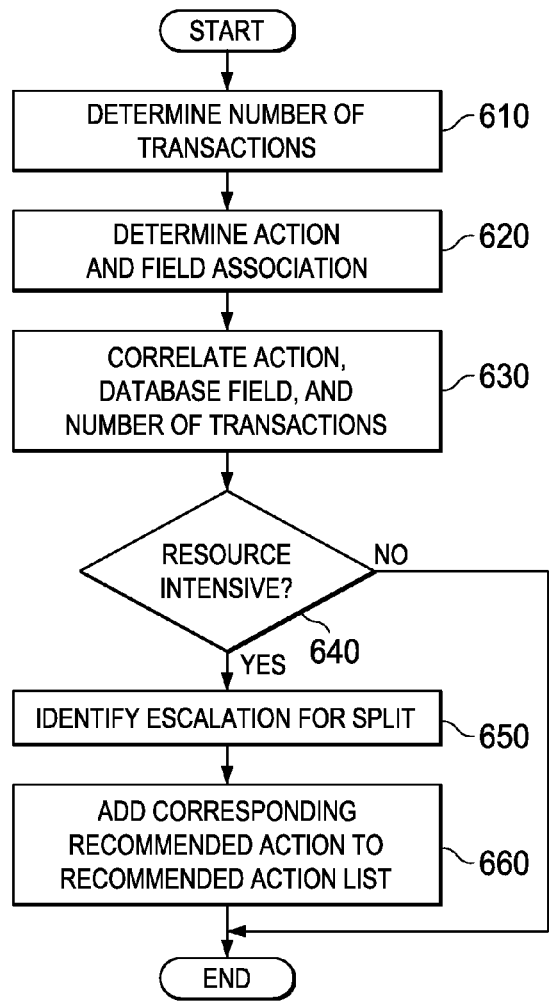
FIG. 6 is a flowchart outlining an example operation for performing a real-time behavior analysis of an escalation in accordance with one illustrative embodiment.

FIG. 6 is a flowchart outlining an example operation for performing a real-time behavior analysis of an escalation in accordance with one illustrative embodiment. The operation outlined in FIG. 6 may be performed, for example by the real-time analysis component 412 of the behavior analysis module 410 of the proactive monitoring and dynamic optimization engine 400, for example. The operation outlined in FIG. 6 is for a single escalation and may be repeated for each escalation in a monitored escalation list.

As shown in FIG. 6, the operation starts by real-time analysis component 412 determining a number of transactions handled by the escalation since a last time that the real-time behavioral analysis was performed or within a designated time interval (step 610). Real-time analysis component 412 determines an action and field association between the number of transactions and the measured metrics of the escalation (step 620) and real-time analysis component 412 correlates this data (step 630). Real-time analysis component 412 makes a determination based on this data as to whether the escalation execution is resource intensive (step 640). If not, the operation terminates. If the escalation execution is resource intensive, then real-time analysis component 412 identifies the escalation for splitting (step 650) and real-time analysis component 412 adds a corresponding recommended action to the recommended action list data structure 432 (step 660). The operation then terminates.

Figure 7:
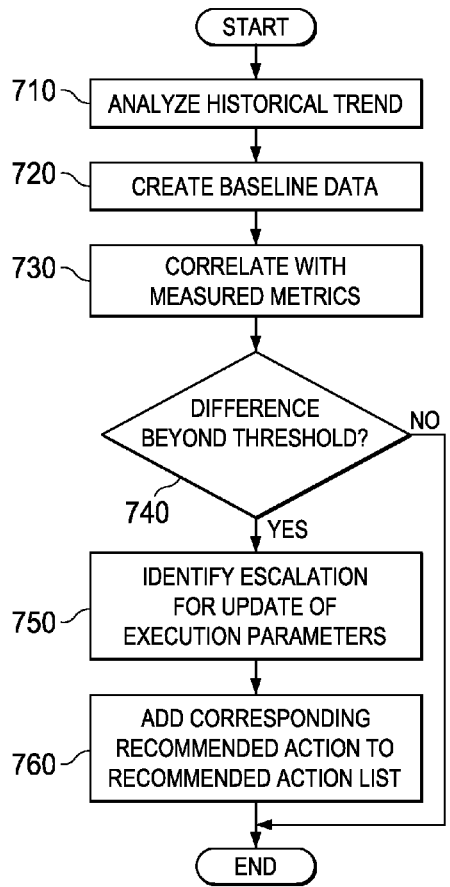
FIG. 7 is a flowchart outlining an example operation for performing a historical trend behavior analysis of an escalation in accordance with one illustrative embodiment.

FIG. 7 is a flowchart outlining an example operation for performing a historical trend behavior analysis of an escalation in accordance with one illustrative embodiment. The operation outlined in FIG. 7 may be performed, for example by the historical analysis component 414 of the behavior analysis module 410 of the proactive monitoring and dynamic optimization engine 400, for example. The operation outlined in FIG. 7 is for a single escalation and may be repeated for each escalation in a monitored escalation list.

As shown in FIG. 7, the operation starts by historical analysis component 414 analyzing the escalation log information (e.g., in escalation log data structure 499) to identify a historical trend in the execution of the escalation (step 710). Historical analysis component 414 calculates a baseline for the performance of the escalation (step 720) and correlates the baseline with measured metrics for the execution of the escalation (step 730). Historical analysis component 414 makes a determination as to whether a difference between the baseline and the measured metrics for the execution of the escalation meets or exceeds one or more predetermined thresholds (step 740). If not, the operation terminates. If so, then historical analysis component 414 identifies the escalation for an update of its execution parameters, e.g., delay value, run interval, target, schedule, etc (step 750). Historical analysis component 414 then adds one or more corresponding recommended actions to the recommended action list data structure 432 (step 760) and the operation terminates.

Figure 8:
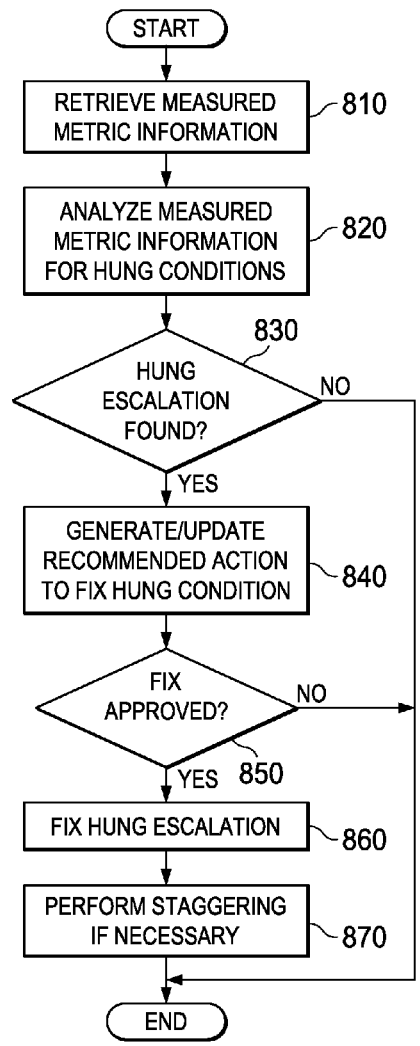
FIG. 8 is a flowchart outlining an example operation for performing hung escalation analysis in accordance with one illustrative embodiment.

FIG. 8 is a flowchart outlining an example operation for performing hung escalation analysis in accordance with one illustrative embodiment. Aspects of the operation outlined in FIG. 8 may be performed, for example by the hung escalation detector 470, escalation fix module 490, and escalation staggering module 495 of the proactive monitoring and dynamic optimization engine 400, for example. The operation outlined in FIG. 8 is for a single escalation and may be repeated for each escalation in a monitored escalation list.

As shown in FIG. 8, the operation starts by hung escalation detector 470 retrieving measure metric information for the escalation, such as from the escalation metric measurement module 420, escalation log data structure 499, or the like (step 810). Hung escalation detector 470 analyzes the measured metric information to determine if any hung conditions are met (step 820). Hung escalation detector 470 makes a determination is made as to whether the escalation is hung (step 830). If not, the operation terminates. If so, then hung escalation detector 470 generates a corresponding recommended action to fix the hung condition and/or updates an existing recommended action for this escalation to indicate the hung condition and a need to fix the escalation for the hung condition (step 840).

The process may then go to the approval process described above and summarized in FIG. 9 hereafter. Escalation fix module 490 makes a determination as to whether the fix of the hung condition for this escalation has been approved (step 850). If not, the operation terminates. If so, then escalation fix module 490 fixes the hung escalation, e.g., escalation fix module 490 executes the recommended action (step 860), and escalation staggering module 495 staggers performance of the updated escalation if determined to be necessary (step 870). The operation then terminates.

Figure 9:
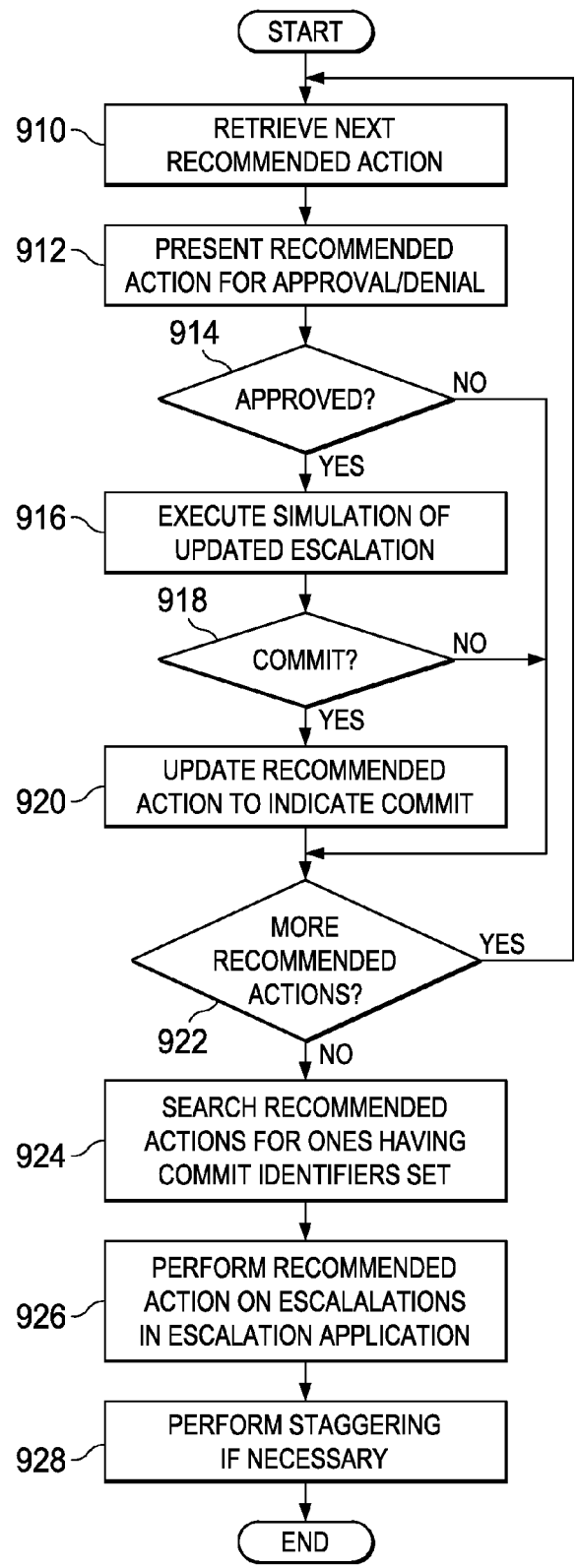
FIG. 9 is a flowchart outlining an example operation for performing an approval/commit operation in accordance with one illustrative embodiment.

FIG. 9 is a flowchart outlining an example operation for performing an approval/commit operation in accordance with one illustrative embodiment. Aspects of the operation outlined in FIG. 9 may be performed, for example, by approval/confirmation module 440, simulation module 450, the escalation update module 460, and escalation staggering module 495 of the proactive monitoring and dynamic optimization engine 400.

As shown in FIG. 9, the operation starts by approval/confirmation module 440 retrieving the next recommended action from the recommended action list data structure 432 (step 910). Approval/confirmation module 440 presents the recommended action for approval/denial (step 912). This may involve an automated approval/denial process and/or the sending of notifications to an authorized user requesting approval/denial and receiving a user input indicating approval/denial.

Approval/confirmation module 440 makes a determination as to whether the recommended action is approved or not (step 914). If the recommended action is approved, simulation module 450 executes a simulation of the updated escalation executed (step 916) and a determination is made as to whether the results of the simulation indicate a significant enough improvement in the performance of the escalation to warrant committing the update to the escalation (step 918). If so, then escalation update module 460 updates the recommended action to indicate that the recommended action should be committed (step 920).

A determination is then made as to whether there are more recommended actions to evaluate (step 922). If so, then the operation returns to step 910. If there are no more recommended actions to evaluate, then escalation update module 460 searches the recommended actions to identify recommended actions that have the commit identifiers set (step 924). For each of these recommended actions, escalation update module 460 commits the actions on the corresponding escalations in the escalation application (step 926). Escalation staggering module 495 performs staggering of the schedule of these escalations is if determined to be necessary (step 928). The operation then terminates.

Thus, the illustrative embodiments provide for improving performance of an escalation. With these embodiments, a computer monitors performance of an escalation in a production environment. The computer identifies a characteristic of the escalation based on the monitored performance and creates a recommendation for improving escalation performance based on the characteristic. In response to an approval of the recommendation, the computer applies the recommendation to the escalation to form one or more recommended escalations. The computer deploys the one or more recommended escalations into the production environment.

In one illustrative embodiment, before the computer deploys the one or more recommended escalations into the production environment, the computer monitors performance of the one or more recommended escalations in a test environment. The computer deploys the one or more recommended escalations into the production environment in response to a determination that the monitored performance of the one or more recommended escalations in the test environment is an improvement over the monitored performance of the escalation in the production environment.

In one illustrative embodiment, the computer identifies the characteristic of the escalation based on the monitored performance by reading a log data structure associated with the escalation and determining from the log data structure that the escalation is associated with first and second customers. The computer identifies in the log data structure a number of database transactions performed by the escalation for the first customer. The characteristic is that the number of database transactions performed by the escalation for the first customer exceeds a threshold. The recommendation comprises disassociating the first customer from the escalation, splitting the escalation into first and second escalations, and associating the second escalation with the first customer.

In another illustrative embodiment, the characteristic is that one or more durations of execution of the escalation vary from an expected duration of execution of the escalation by a threshold and the recommendation comprises adjusting an execution time of the escalation. In still another illustrative embodiment, the characteristic is that the escalation historically processes records in a database at a rate that is slower than a rate at which another escalation processes records in the database and the recommendation comprises executing the escalation at a frequency that is higher than a frequency at which the escalation is configured to execute.

In one illustrative embodiment, before the computer monitors performance of the escalation in the production environment, the computer queries parameters associated with the escalation, determines from the parameters that the escalation generated a number of errors over a period of time at a rate that exceeds a threshold, and adds the escalation to a list of escalations for performance monitoring. Moreover, the computer may gather load data for use in identifying the characteristic.

In another illustrative embodiment, after the computer deploys the one or more recommended escalations into the production environment, the computer determines that a defined action of a recommended escalation of the one or more recommended escalations did not execute. In response, the computer notifies a user that the defined action of the recommended escalation did not execute.

In other illustrative embodiments, mechanisms for minimizing occurrences of hanging escalations in a computer system are provided. With these illustrative embodiments, a computer determines that a number of escalations are scheduled for simultaneous execution in a time interval in a production environment. The computer divides the time interval by the number of escalations to form a shortened time interval. The computer reschedules execution of the number of escalations in the production environment such that a plurality of subsets of the number of escalations execute in a staggered order according to the shortened time interval. A hanging escalation is an escalation that fails to complete, fails to process all data or records that the escalation was to process, or completes beyond an allotted processing time.

The computer may receive a configuration defining a subset of the plurality of subsets, the escalations in the subset sharing a common characteristic. The common characteristic may be selected from the group consisting of a frequency at which the escalations in the subset failed to complete execution, a frequency at which the escalations in the subset failed to process all data or records that the escalations were to process, a frequency at which the escalations in the subset completed execution beyond an allotted processing time, a load, a customer, a notification, a service level agreement, and a database object.

In one illustrative embodiment, before the computer reschedules the execution of the number of escalations in the production environment, the computer reschedules the execution of the number of escalations in a test environment.

The computer may then reschedule the execution of the number of escalations in the production environment in response to a determination that performance of the rescheduled execution of the number of escalations in the test environment is improved over performance of simultaneous execution of the number of escalations in the production environment. In one illustrative embodiment, the computer reschedules execution of the number of escalations in the production environment such that each escalation in the number of escalations has a different execution start time. Each of the escalations in the number of escalations may have a same execute time period.

In one illustrative embodiment, the computer classifies escalations of the number of escalations into a plurality of escalation types. Each of the subsets in the plurality of subsets may be associated with at least one escalation type in the plurality of escalation types. The computer may classify escalations of the number of escalations into a plurality of escalation types based on characteristics of the escalations. The characteristics of the escalations may comprise at least one of a hung frequency, a load of the escalation, a customer associated with the escalation, a notification generated by the escalation, a service level agreement (SLA) associated with the escalation, or a target of the escalation. Escalations of a same escalation type may be scheduled to start at a same start time.

In another illustrative embodiment, mechanisms for processing work items that have not been completed by a first escalation are provided. With this illustrative embodiment, a computer determines that the first escalation failed to complete execution, processed fewer work items than the first escalation is configured to process, or completed execution beyond an allotted processing time. The computer duplicates the first escalation to form a second escalation. The computer configures the second escalation to process the work items that have not been completed by the first escalation. The computer disables the first escalation and activates the second escalation to process the work items that have not been completed by the first escalation.

The detection of the first escalation having failed to complete execution, failed to process the work items, or completed execution beyond an allotted processing time may comprise the computer determining that a current time is greater than a sum of a last time that the first escalation executed, a time interval between consecutive scheduled executions of the first escalation, and an allowed time period for completion of execution of the first escalation. The allowed time period for completion of execution of the first escalation is a predetermined time period value. The allowed time period for completion of execution of the first escalation may be calculated based on previous results of one or more previous executions of the first escalation.

The determining operation may comprise the computer determining that the first escalation processed fewer work items than the first escalation is configured to process. The determining operation may comprise the computer determining that the first escalation failed to complete by comparing a processing time metric for the first escalation in a log data structure to a stored threshold value stored in the computer. The determining operation may comprise the computer detecting that the first escalation failed to complete by determining that the first escalation completed within an allotted processing time but failed to perform a defined action in the first escalation.

The computer may store a plurality of threshold values. Each threshold value may be associated with a different type of escalation. The stored threshold value may be a threshold value corresponding to a type of escalation of the first escalation.

The computer may determine a recommendation for modifying the first escalation. The computer may apply the recommendation to the second escalation to generate a modified second escalation. The computer may generate a notification to a user requesting that the user approve application of the recommendation to the second escalation. The notification may request that the user indicate whether to apply the recommendation immediately, apply the recommendation at a next execution of the second escalation, or apply the recommendation at a later scheduled time.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system comprising a processor and a memory, for processing work items by a first escalation task, the method comprising:
   monitoring, by the data processing system, execution of the first escalation task;
   determining, by the data processing system, based on results of the monitoring, whether the first escalation task should be modified;
   replicating, by the data processing system, the first escalation task in response to a determination that the first escalation task should be modified to generate a replicated escalation task, wherein the replicated escalation task is a copy of the first escalation task;
   modifying, by the data processing system, the replicated escalation task to modify at least one execution parameter of the replicated escalation task to be different from the first escalation task, thereby generating a second escalation task having modified parameters from the first escalation task;

disabling, by the data processing system, the first escalation task such that the first escalation task is no longer executed by the data processing system; and activating the second escalation task for execution by the data processing system in accordance with the modified parameters, wherein monitoring execution of the first escalation task comprises monitoring for hung conditions of the first escalation task, and wherein determining, based on results of the monitoring, whether the first escalation task should be modified comprises determining whether executions of the first escalation task result in a hung condition with a predetermined threshold amount of frequency, and wherein modifying the replicated escalation task comprises modifying the replicated escalation task to process only work items that were not able to be processed by the first escalation task due to a hung condition of the first escalation task during a previous time interval.

2. The method of claim 1, wherein monitoring execution of the first escalation task comprises at least one of monitoring real-time execution of the first escalation task or monitoring a historical trend of previous executions of the first escalation task.

3. The method of claim 1, wherein monitoring execution of the first escalation task comprises monitoring response times for database transactions evaluated by the escalation and monitoring a number of database transactions evaluated by the escalation, and wherein determining, based on results of the monitoring, whether the first escalation task should be modified comprises determining whether the number of database transactions exceeds a predetermined first threshold and determining whether response times for the database transactions exceed a second threshold.

4. The method of claim 1, wherein:
monitoring execution of the first escalation task comprises calculating processing time and an amount of work items processed by the first escalation,
determining, based on results of the monitoring, whether the first escalation task should be modified comprises evaluating a plurality of optional schedules of execution of the first escalation task to determine, for each optional schedule, a number of work items that can be processed under the optional schedule, and determining whether a run time interval of the first escalation task should be modified based on results of evaluating the plurality of optional schedules, and
in response to determining that the run time interval of the first escalation task should be modified, modifying the replicated escalation task comprises splitting the replicated escalation task into a plurality of replicated escalation tasks and modifying a runtime schedule of each of the replicated escalation tasks to be different from the first escalation task.

5. The method of claim 1, wherein determining whether the first escalation task should be modified comprises determining whether the first escalation task did not process all of a first set of work items during a first instance of the previous time interval at least by determining that a current time is greater than a sum of the following three values: a last time that the first escalation task completed execution, a time interval between consecutive scheduled executions of the first escalation task, and an allowed time period for completion of execution of the first escalation task.

6. The method of claim 1, wherein determining whether the first escalation task should be modified comprises analyzing historical trend information for the execution of a similar escalation task to determine a historical trend of the similar escalation task, and wherein modifying the replicated escalation task comprises modifying, based on the historical trend of the similar escalation task, at least one of a delay value indicating a time delay applied to hung condition determinations associated with the second escalation task, or a runtime schedule of the second escalation task, based on the historical trend of the similar escalation task.

7. The method of claim 1, wherein determining whether the first escalation task should be modified further comprises determining that the first escalation task did not process all of a first set of work items within an allotted time at least by comparing a processing time metric for the first escalation task in a log data structure to a stored threshold value stored in the data processing system.

8. The method of claim 7, wherein the data processing system stores a plurality of threshold values, wherein each threshold value is associated with a different type of escalation task, and wherein the stored threshold value is a threshold value, in the plurality of threshold values, corresponding to a type of escalation task of the first escalation task.

9. The method of claim 1, wherein determining whether the first escalation task should be modified further comprises detecting that execution of the first escalation task failed to complete by determining that the first escalation task completed execution within an allotted processing time but failed to perform a defined action in the first escalation task.

10. A computer program product comprising a computer hardware storage device having a computer readable program stored therein, wherein the computer readable program, when executed on a data processing system, causes the data processing system to:

monitor execution of a first escalation task;

determine, based on results of the monitoring, whether the first escalation task should be modified;

replicate the first escalation task in response to a determination that the first escalation task should be modified to generate a replicated escalation task, wherein the replicated escalation task is a copy of the first escalation task;

modify the replicated escalation task to modify at least one execution parameter of the replicated escalation task to be different from the first escalation task, thereby generating a second escalation task having modified parameters from the first escalation task;

disable the first escalation task such that the first escalation task is no longer executed by the data processing system; and activate the second escalation task for execution by the data processing system in accordance with the modified parameters, wherein the computer program further causes the data processing system to monitor execution of the first escalation task at least by monitoring for hung conditions of the first escalation task, and wherein determining, based on results of the monitoring, whether the first escalation task should be modified comprises determining whether executions of the first escalation task result in a hung condition with a predetermined threshold amount of frequency, and wherein the computer program further causes the data processing system to modify the replicated escalation task at least by modifying the replicated escalation task to process only work items that were not able to be processed by the first escalation task due to a hung condition of the first escalation task during a previous time interval.

11. The computer program product of claim 10, wherein the computer program further causes the data processing system to monitor execution of the first escalation task at least by at least one of monitoring real-time execution of the first escalation task or monitoring a historical trend of previous executions of the first escalation task.

12. The computer program product of claim 10, wherein the computer program further causes the data processing system to monitor execution of the first escalation task at least by monitoring response times for database transactions evaluated by the escalation and monitoring a number of database transactions evaluated by the escalation, and wherein the computer program further causes the data processing system to determine, based on results of the monitoring, whether the first escalation task should be modified at least by determining whether the number of database transactions exceeds a predetermined first threshold and determining whether response times for the database transactions exceed a second threshold.

13. The computer program product of claim 10 wherein the computer program further causes the data processing system to:
monitor execution of the first escalation task at least by calculating processing time and an amount of work items processed by the first escalation,
determine, based on results of the monitoring, whether the first escalation task should be modified at least by evaluating a plurality of optional schedules of execution of the first escalation task to determine, for each optional schedule, a number of work items that can be processed under the optional schedule, and determining whether a run time interval of the first escalation task should be modified based on results of evaluating the plurality of optional schedules, and
modify, in response to determining that the run time interval of the first escalation task should be modified, the replicated escalation task at least by splitting the replicated escalation task into a plurality of replicated escalation tasks and modifying a runtime schedule of each of the replicated escalation tasks to be different from the first escalation task.

14. The computer program product of claim 10, wherein the computer program further causes the data processing system to determine whether the first escalation task should be modified at least by determining whether the first escalation task did not process all of a first set of work items during a first instance of the previous time interval at least by determining that a current time is greater than a sum of the following three values: a last time that the first escalation task completed execution, a time interval between consecutive scheduled executions of the first escalation task, and an allowed time period for completion of execution of the first escalation task.

15. The computer program product of claim 10, wherein the computer program further causes the data processing system to determine whether the first escalation task should be modified at least by analyzing historical trend information for the execution of a similar escalation task to determine a historical trend of the similar escalation task, and wherein the computer program further causes the data processing system to modify the replicated escalation task at least by modifying, based on the historical trend of the similar escalation task, at least one of a delay value indicating a time delay applied to hung condition determinations associated with the second escalation task, or a runtime schedule of the second escalation task, based on the historical trend of the similar escalation task.

16. The computer program product of claim 10, wherein the computer program further causes the data processing system to determine whether the first escalation task should be modified further at least by determining that the first escalation task did not process all of a first set of work items within an allotted time at least by comparing a processing time metric for the first escalation task in a log data structure to a stored threshold value stored in the data processing system.

17. The computer program product of claim 16, wherein the data processing system stores a plurality of threshold values, wherein each threshold value is associated with a different type of escalation task, and wherein the stored threshold value is a threshold value, in the plurality of threshold values, corresponding to a type of escalation task of the first escalation task.

18. An apparatus comprising:
a processor; and
a memory coupled to the processor, wherein the memory comprises instructions which, when executed by the processor, cause the processor to:
monitor execution of the first escalation task;
determine, based on results of the monitoring, whether the first escalation task should be modified;
replicate the first escalation task in response to a determination that the first escalation task should be modified to generate a replicated escalation task, wherein the replicated escalation task is a copy of the first escalation task;
modify the replicated escalation task to modify at least one execution parameter of the replicated escalation task to be different from the first escalation task, thereby generating a second escalation task having modified parameters from the first escalation task;
disable the first escalation task such that the first escalation task is no longer executed by the data processing system; and
activate the second escalation task for execution by the data processing system in accordance with the modified parameters, wherein the instructions further cause the processor to monitor execution of the first escalation task at least by monitoring for hung conditions of the first escalation task, and wherein determining, based on results of the monitoring, whether the first escalation task should be modified comprises determining whether executions of the first escalation task result in a hung condition with a predetermined threshold amount of frequency, and wherein the instructions further cause the processor to modify the replicated escalation task at least by modifying the replicated escalation task to process only work items that were not able to be processed by the first escalation task due to a hung condition of the first escalation task during a previous time interval.

* * * * *